US008509193B2

(12) United States Patent
Hassan et al.

(10) Patent No.: US 8,509,193 B2
(45) Date of Patent: Aug. 13, 2013

(54) PACKET AGGREGATION

(75) Inventors: Amer A. Hassan, Kirkland, WA (US); Thomas W. Kuehnel, Seattle, WA (US); Pan Chun Wen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 12/506,683

(22) Filed: Jul. 21, 2009

(65) Prior Publication Data
US 2011/0019557 A1    Jan. 27, 2011

(51) Int. Cl.
*H04L 12/28* (2006.01)

(52) U.S. Cl.
USPC ........................................ 370/332; 370/230.1

(58) Field of Classification Search
USPC ................................................ 370/230, 230.1
See application file for complete search history.

(56) References Cited

U.S. PATENT DOCUMENTS

| | | | | |
|---|---|---|---|---|
| 4,613,990 | A * | 9/1986 | Halpern | 455/522 |
| 6,914,889 | B1 * | 7/2005 | Bi et al. | 370/318 |
| 7,391,769 | B2 | 6/2008 | Rajkumar et al. | |
| 7,460,553 | B2 * | 12/2008 | Riveiro Insua et al. | 370/437 |
| 7,672,227 | B2 * | 3/2010 | Santoso et al. | 370/217 |
| 2005/0122960 | A1 | 6/2005 | Khan | |
| 2006/0029099 | A1 | 2/2006 | Jang | |
| 2006/0229025 | A1 * | 10/2006 | Gandhi et al. | 455/69 |
| 2007/0201400 | A1 | 8/2007 | Kang et al. | |
| 2007/0286149 | A1 | 12/2007 | Yamamoto et al. | |
| 2008/0144497 | A1 * | 6/2008 | Ramprashad et al. | 370/230.1 |
| 2008/0240140 | A1 | 10/2008 | Dabagh et al. | |
| 2009/0122700 | A1 * | 5/2009 | Aboba et al. | 370/230 |
| 2009/0154475 | A1 * | 6/2009 | Lautenschlaeger | 370/400 |
| 2009/0245260 | A1 * | 10/2009 | Mohaban et al. | 370/392 |

FOREIGN PATENT DOCUMENTS

WO    WO 2007094547 A1    8/2007

OTHER PUBLICATIONS

Castro, et al., "Capacity Increase for Voice Over IP Traffic Through Packet Aggregation in Wireless Multihop Mesh Networks," *IEEE*, 6 pgs., (printed Apr. 22, 2009).
Dely, "Adaptive Aggregation of Voice Over IP in Wireless Mesh Networks," http://www.essays.se/essay/a4ef0ab652, pp. 1-3, (printed Apr. 22, 2009).
Razafindralambo, et al., "Dynamic and Distributed Packet Aggregation to Solve the Performance Anomaly in 802.11 Wireless Networks," *Elsevier, ScienceDirect, Computer Networks*, vol. 52, pp. 77-95, (published online Sep. 29, 2007).

* cited by examiner

*Primary Examiner* — Yemane Mesfin
*Assistant Examiner* — Wanda Z Russell

(57) ABSTRACT

Methods and apparatus for improving the efficient use of a wireless channel. Flows of compatible packets to be transmitted are processed in separate queues based on characteristics of the packets, destination and quality of service (QoS) requirements. Aggregation parameters selected for each flow define when packets aggregated on a flow are to be sent. The aggregation parameters may reflect packet type, such as QoS requirements, an application type and/or wireless channel conditions. In some embodiments, the aggregation parameters indicate a threshold frame size or include a threshold time to buffer a packet while waiting for other packets on that flow to fill a frame. When an aggregation parameter for a queue is met, the aggregated packets are transmitted as a frame. The queue is cleared and subsequent packets may begin aggregating. Some types of packets, such as acknowledgment packets, may be sent without aggregation.

18 Claims, 7 Drawing Sheets

the amount of data transmitted in a frame. One approach

PACKET AGGREGATION

BACKGROUND

When communicating data over a network, overhead information is required for reliable delivery from the source device to the destination device. Examples of overhead information that may be required include an address of the source device and an address of the destination device. Error checking and error correcting information may also be sent. These types of overhead information are generally sent as part of a packet or frame of data. Other types of overhead information may be used to ensure information is reliably routed between a source and a recipient. An example of such overhead may be an acknowledgement packet.

Regardless of how the overhead information is reflected in ongoing communication, it is known that aggregating information to reduce the number of interactions required to convey data from a source to a destination can increase the ratio of information bits to overhead bits conveyed. Increasing this ratio makes for more efficient network communication.

Aggregation schemes have been developed to take advantage of more efficient communication. For network protocols that require data to be sent in packets, aggregation may be achieved by aggregating the data from multiple packets. FIGS. 1A-1D illustrate known schemes for packet aggregation.

FIG. 1A illustrates conceptually a frame 120, formatted for wireless communication. In this example, the frame contains a Media Access Control (MAC) Service Data Unit (MSDU) according to TCP/IP or the "Ethernet" protocol with additional fields added to support wireless communication. To the MSDU may be added a media access control (MAC) header, forming what is essentially an Ethernet frame. A radio preamble 101, radio header 103 and frame check sequence (FCS) 107 may be added to "wrap" the Ethernet frame for wireless communication.

In frame 120, media access control (MAC) header 105 as well as radio preamble 101, radio header 103 and frame check sequence (FCS) 107 constitute overhead for transmission of MSDU 110. Further, in the example illustrated, an acknowledgment (ACK) frame 130 is returned from the receiving device when frame 120 is received successfully. ACK frame 130, which contains a radio preamble 101, radio header 103 and ACK payload 109, is also overhead. The time between sending of frame 120 and receipt of ACK frame 130 may also be regarded as overhead. Other time that may be included in the overhead is the time to ensure a channel is available for transmission of the frame.

The ratio of data to overhead may be increased by increasing the amount of data transmitted in a frame. One approach to increasing the amount of data is illustrated in FIG. 1B. In FIG. 1B, MSDU 111 takes up a larger percentage of the frame 140 than is the case of MSDU 110 in frame 120.

An alternative approach to reducing overhead is sometimes called frame aggregation. In frame aggregation, data from multiple frames may be combined into a single communication, which is communicated with less overhead than if the multiple frames were communicated separately.

In networks, such as 802.11n wireless networks, protocols for aggregating frames have been defined. IEEE 802.11n supports aggregation technologies including Media Access Control (MAC) Service Data Units (MSDU) aggregation and MAC Protocol Data Unit (MPDU) aggregation. These aggregation techniques are supported at the MAC layer, and some manufacturers of chipsets for implementing wireless network interfaces have incorporated functionality to support MSDU or MPDU aggregation.

FIG. 1C illustrates an example of MSDU aggregation. MSDU aggregation allows the information from what otherwise would be transmitted as multiple frames to be aggregated into a single frame. Specifically, data units 112-1 through 112-N, which represent data that might otherwise each be sent as separate frames, are aggregated into a frame 150 which can be sent in a single communication. A single radio preamble 101, radio header 103 and frame check sequence (FCS) 107 is sent for frame 150. In MSDU aggregation, the data is destined to the same end point, which is identified by a single MAC header 108. Likewise, a single ACK frame 130 (FIG. 1A) may be sent in response to the entire MSDU frame 150, avoiding the need to wait for separate acknowledgements for transmission of separate packets. Thus, the entire frame is sent with overhead similar to that of a single frame, but with much more data.

MPDU is similar. However, the individual MSDU's may be destined for separate endpoints, though the entire frame is sent to one wireless access point. As illustrated by frame 160 in FIG. 1D, each MSDU 110-1 to 110-N has a corresponding MAC header 105-1 to 105-N, which identifies the end point for that data. This collection of data units is wrapped with a radio preamble 101, radio header 103 and frame check sequence (FCS) 107. Because a separate MAC header 105-1 to 105-N is included for each MSDU, an access point receiving frame 160 can forward each MSDU to a different destination. Though, the separate MAC headers 105-1 to 105-N constitute more overhead information than in MSDU frame 150.

SUMMARY

Aggregation techniques, particularly for wireless communication, are improved by setting aggregation parameters dynamically. Aggregation parameters may be set based on factors such as channel conditions, characteristics of applications generating data for communication or packet characteristics. Different data flows, each flow representing compatible data that can be aggregated, may receive different aggregation parameters.

The aggregation parameters may influence one or more aspects of processing packets, such as the amount of data that is aggregated before transmission of a frame or the time that data will be buffered before a frame is sent. As packets are processed, they may be held in a queue until the aggregation parameters are met. Accordingly, these aggregation parameters may be used within a network interface to control operation of queues that buffer transmit data in each data flow until the aggregation parameters for that flow are met.

In some embodiments, aggregation may be implemented within the network stack of an operating system of a computer connected to a network. As applications or operating system components generate data packets for transmission, those packets may be captured and assembled into a frame. When the frame is completed, it may be passed to conventional network interface hardware. Though, in some embodiments, the aggregation parameters may be passed to network interface hardware, which may capture packets and implement aggregation for each of the active flows in accordance with aggregation parameters for that flow.

In some embodiments, the frames formed by aggregating packets may be in a conventional format. The packets, for example, may be formatted for either MSDU or MPDU aggregation. Such a formatting enables aggregation techniques as described herein to be used on computers connected to networks without requiring modifications to other network components.

Nonetheless, the aggregation parameters may be set to achieve different aggregation behaviors for different flows. For some types of packets, little or no aggregation may be provided. Such an approach may be appropriate for acknowledgment (ACK) packets or other Real Time Protocol (RTP) packets. Other packets may be assigned to different flows based on a quality of service (QoS) requirement, application type or other suitable parameter. Regardless of how the packets are assigned to flows, aggregation parameters may be set for each flow in a way that balances data throughput with acceptable latency. That balancing may depend on channel conditions, because noisy or other poor channel conditions may impact the probability that a frame of a given size can be communicated without retransmission.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
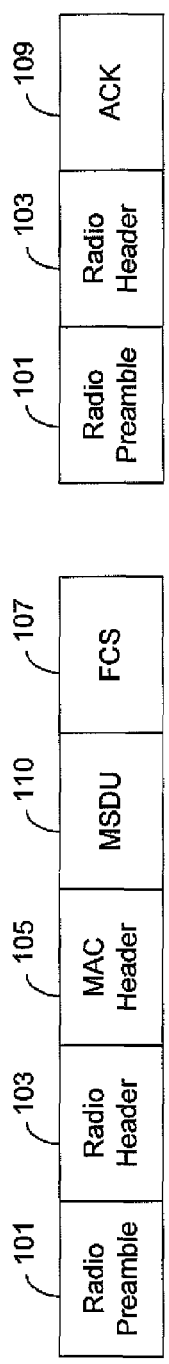
FIG. 1A illustrates an example of a structure of a conventional data frame and an acknowledgement (ACK) frame.
Figure 1B:
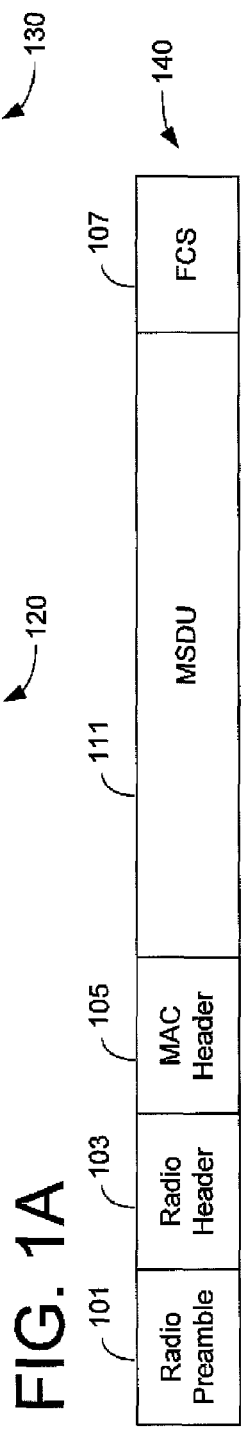
FIG. 1B illustrates an example of an alternative structure of a conventional data frame and an acknowledgement frame.
Figure 1C:
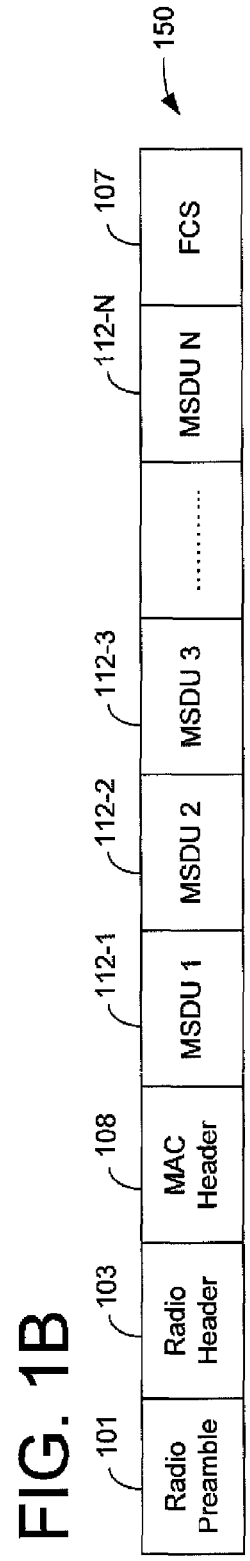
FIG. 1C illustrates an example of the structure of a conventional MAC Service Data Unit (MSDU) frame.
Figure 1D:
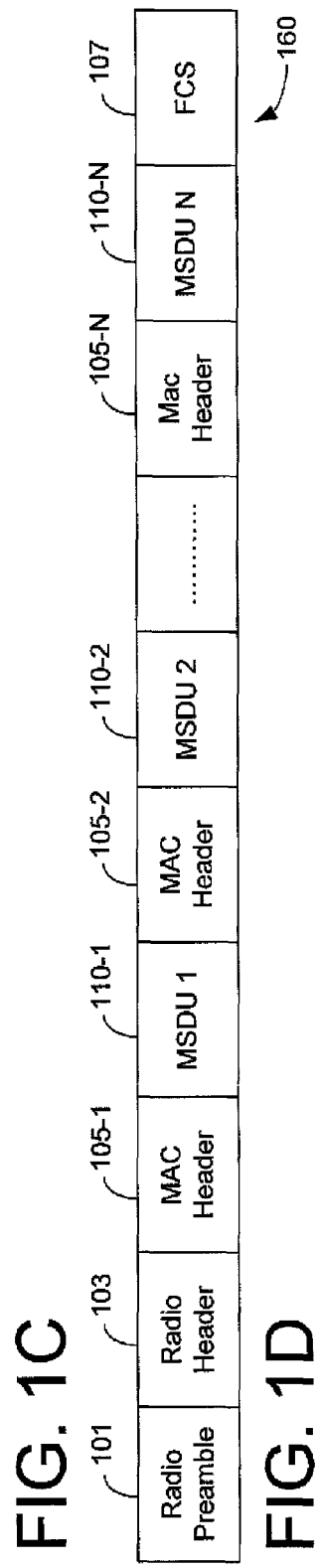
FIG. 1D illustrates an example of the structure of a conventional MAC Protocol Data Unit (MPDU) frame.

In today's computing ecosystems, communicating data between a source and destination over a network is commonplace. The inventors have recognized and appreciated that, when data is formed into frames, frames of a given size may be communicated efficiently through one network but that same frame size may be inefficient for communicating through another network or in the presence of different network conditions. Moreover, the overall benefit obtained through the use of aggregation techniques may depend on the type of application generating the packets or the type of the packet.

The inventors believe that known aggregation techniques have not been more widely used because, though they should theoretically provide improved performance, they have not been implemented in a way that achieves this improvement. In most instances, prior aggregation techniques were implemented as part of Media Access Control (MAC) hardware, and could not be effectively controlled to provide different aggregation parameters for different data flows.

Throughput may be improved by aggregating packets at a wireless device and transmitting the aggregated packets as a single "frame" to a wireless destination, such as a network access point. As in a conventional aggregation scheme, the wireless access point may then direct the data in the frame to the appropriate endpoint or endpoints. However, unlike in a conventional frame aggregation scheme, the number of packets aggregated into a frame, the amount of time packets will be buffered before sending a frame or other operating characteristics of aggregation may be set for each flow. The inventors have recognized and appreciated that aggregation parameters, such as when and how packets are aggregated, may be controlled based on channel conditions over which the frame is to be transmitted, the type of application generating the packets to be transmitted, the packet's quality of service (QoS) requirements, the packet's type, and/or other system conditions.

Flows containing compatible packets for aggregation may be defined in any suitable way. As one example, when MSDU aggregation is used, packets that share the same source address, destination address and QoS requirements may be aggregated as part of the same flow. The source address may specify the MAC address of the wireless network interface card (WNIC) sending the packet from the wireless device. Similarly, the destination address may specify the MAC address of the wireless destination. The "destination address" refers to the wireless receiver to which the packet is being sent. This is distinguished from the final destination of the packet, which may be different from the wireless receiver. For example, the destination address for a wireless device connected to an infrastructure network may be an access point, but the access point may forward the packet to its final destination, such as a website or another computer connected to the infrastructure network.

QoS requirements may define any of acceptable delay, bit rate, jitter, packet dropping probability, bit error rate, delivery requirements, and any other requirements for packet delivery. QoS requirements for a packet may be implied by the type of application sending the packet, specified by the application, or indicated by the packet itself. QoS requirements, for example, may be reflected in a tag in the packet indicating a relative priority with which routers or other network devices will process the packet.

As one example, the 3-tuple <source address, destination address, QoS tag> define a flow. Packets having the same or compatible flow may be aggregated using aggregation parameters determined from the wireless channel conditions, the packet's QoS requirements, the packet's type, and/or other system conditions. A separate data structure, such as a queue, may be established for each flow. Packets in a flow may be buffered in the queue associated with the flow, allowing different buffering conditions to be established for different flows.

For each queue, aggregation parameters define when the aggregated packets in a queue should be transmitted as a frame. The aggregation parameters may be based, for example, on the channel conditions and QoS requirements. In some embodiments, an aggregation parameter defines the maximum size of the aggregated packets (e.g., by the number of packets or the amount of raw data to be transmitted as a frame). Another aggregation parameter may define a maximum amount of time to hold a packet in a queue before sending a frame. In the exemplary embodiments described herein, the aggregation parameters associated with a flow are met when any one or more of the aggregation parameters is met.

Accordingly, when the aggregation parameters for a queue are met, the queue's aggregated packets are encapsulated in a frame by adding any overhead data required for transmission over the wireless channel. In some embodiments, the frame is compliant with MSDU aggregation or MPDU aggregation. Though, any suitable frame format may be used. Once the frame is formed, it is transmitted by the wireless network interface to the destination. Because multiple packets are aggregated into a single frame, the overhead data is sent once for all the aggregated packets in the frame rather than once for each individual packet. At the destination, such as an access point, the constituent packets may be recovered and, if formatted for separate endpoints, suitably forwarded to subsequent destinations.

Figure 2:
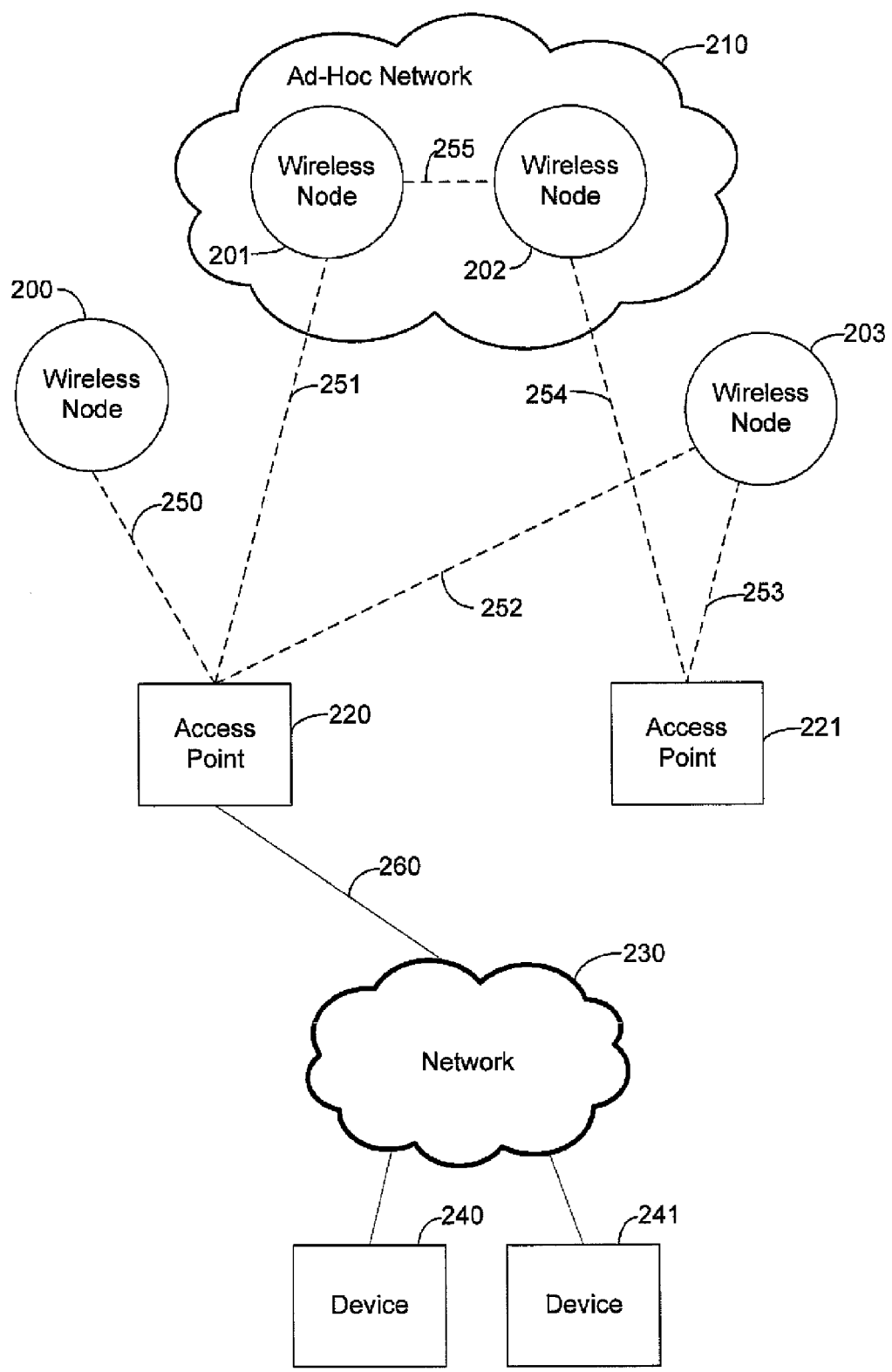
FIG. 2 is a block diagram showing wireless devices configured to aggregate packets for transmission between devices over wired and wireless network.

Such an approach to aggregating packets may be employed in any suitable network setting. FIG. 2 shows a block diagram of an example set of networks and devices in which packet aggregation may be implemented. The configuration of networks and devices shown in FIG. 2 is illustrative and any suitable number and configuration of devices and networks may be used.

In FIG. 2, wireless nodes 200-204 are configured for wireless communication over wireless channels 250-254 as shown. Wireless channels 250-254 may each be established by the associated devices at any time such that the devices are "connected" and can communicate information wirelessly. In some embodiments, these wireless devices may communicate using an 802.11n protocol. However, the specific format of wireless communication is not critical to the invention and any suitable protocol may be employed.

As is known in the art, a wireless networks may include one or more access points, such as access point 220 or access point 221, to allow wireless nodes to connect to other components. Wireless node 203, for example, may communicate with access point 221 via wireless channel 253. Access point 221 may facilitate communication between wireless node 203 and wireless device 202 via wireless channels 254. In the example of FIG. 2, access point 220 is illustrated connected to a wired network 230 via connection 260. Network 230 may be the Internet, a corporate network, or any other suitable type of network accessible to access point 220. Through access point 220, wireless nodes may communicate with devices on network 230, such as device 240 or device 241, in a configuration sometimes called an infrastructure network.

Direct wireless communication between wireless nodes 201 and 202 may be achieved over wireless channel 255 in an ad-hoc network 210. Ad-hoc network 210 does not require an access point to control communications between wireless nodes. Various wireless networking technologies, such as IEEE 802.11, support ad-hoc networking, and known approaches may be employed.

In addition, FIG. 2 shows a further possible connection format. As illustrated, a connection may be formed between wireless device 202 and 203 through access point 221. Accordingly, FIG. 2 illustrates that packet aggregation as described herein may be used in connection with any suitable network topology.

Any or all of the wireless devices in a network may use packet aggregation as described herein. For example, wireless nodes 200-203 and access points 220-221 may aggregate packets for communication using aggregation parameters established as described herein. These devices may be any suitable type of devices. In FIG. 2 wireless nodes 200-203 are each represented in a similar way, though they may each be laptop or desktop computers, personal digital assistants (PDAs), netbooks, wireless routers, wireless phones or any other suitable type of device. Wireless nodes 200-203 may support various routing schemes such as unicast, multicast, and broadcast. Some example embodiments of a wireless device is subsequently described with reference to FIG. 5.

Wireless nodes 200-203 and access points 220-221 may utilize any suitable wireless networking technology to form wireless connections 250-253. For example and not limitation, a wireless nodes and/or access point may support one or more of IEEE 802.11, Wi-Fi, Zigbee, WWAN, cellular, Bluetooth, Wireless 1394, UWB, HiperLAN, Wireless USB, or any other suitable wireless networking technology. Though, the invention is not limited to use in connection with wireless channels.

Figure 3C:
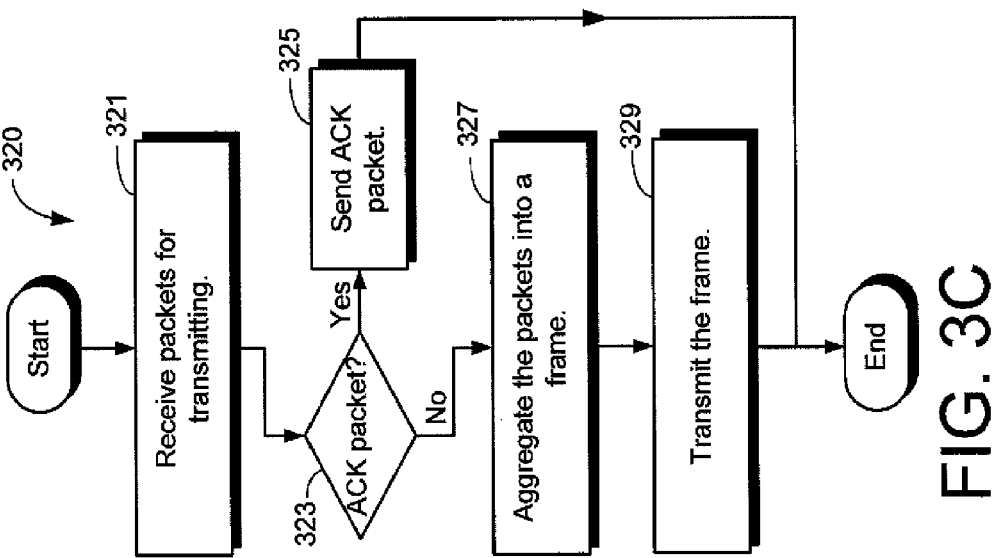
FIG. 3C is a flow diagram of a method for aggregating and transmitting packets using the packet's type to determine which packets to aggregate.
Figure 3B:
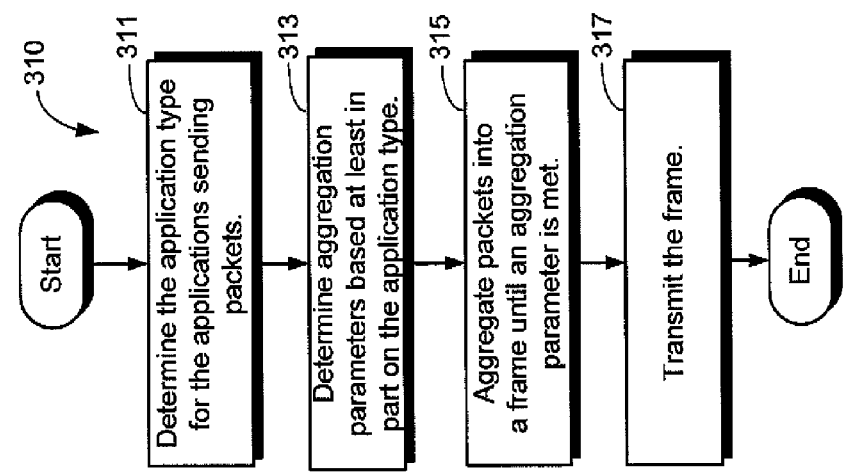
FIG. 3B is a flow diagram of a method for aggregating and transmitting packets using the application type of the application generating the packets to determine aggregation parameters.
Figure 3A:
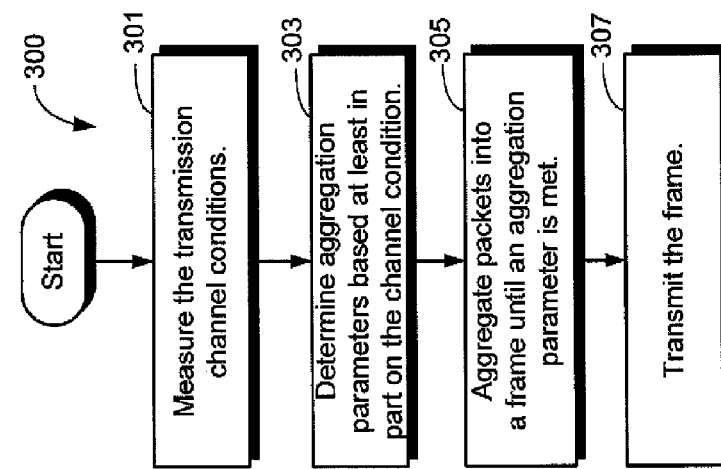
FIG. 3A is a flow diagram of a method for aggregating and transmitting packets using channel conditions to determine aggregation parameters.

FIGS. 3A-3C show flow diagrams of respective methods 300, 310, and 320 for aggregating and transmitting packets in frames. These methods may be used separately or in any combination within a computing device communicating over a network. In a wireless network, methods 300, 310 and 320 may be performed by or on behalf of a suitable wireless device, such as any of wireless nodes 200-203 or access points 220-221. In some embodiments, methods 300, 310, and 320 may be performed by an operating system executed by one or more processors of a suitable wireless device, though any suitable combination of hardware and/or software may be used to implement these methods. It should be appreciated that while methods 300, 310 and 320 are described separately, they may be implemented together or in any suitable combination to control packet aggregation for a wireless device.

The flow diagram in FIG. 3A shows method 300 for aggregating and transmitting packets using channel conditions to determine aggregation parameters. The channel conditions characterize the quality of the wireless channel over which aggregated packets will be sent.

At step 301, one or more channel conditions are measured. Channel conditions provide an indication of the characteristics of the channel to be used for communication. Channel conditions may be measured in any suitable way. In some embodiments, channel conditions are measured by a wireless network interface of a wireless device. The channel conditions measured at step 301 may include, for example and not limitation, one or more of signal strength, transmission error rate, interface calls for the average throughput, medium acquisition delay, percentage of beacons received, or any other suitable indicator of a characteristic of a channel.

Some of these channel conditions are appropriate only for use in a wireless network. Though, other channel characteristics may be suitable for use with a wired or wireless network or may only be applicable to wired networks. For example, parameters such as available bandwidth or network congestion may be measured at step 301. Accordingly, the specific conditions measured may depend on the type of network in use.

The channel conditions measured may be those that are known in the art and can be measured using known techniques. For example, a wired or wireless network interface card may contain circuitry that measures one or more of these characteristics. Though, conditions may be measured in any suitable way.

Regardless of which channel conditions are measured and how the channel conditions are measured, at step 303, packet aggregation parameters are determined based at least in part on the channel conditions. Aggregation parameters specify conditions under which packets buffered for a particular flow are transmitted.

One or more aggregation parameters may be determined from the channel conditions in any suitable way. Packet aggregation parameters may be determined by a computation based on a formula that combines values representing channel conditions, may be determined heuristically based on a set of rules or other representation of heuristic criteria applied to the channel conditions, may be determined using a lookup table that relates conditions to aggregation parameters or may be determined in any other suitable way.

As an example, the aggregation parameters may include a parameter specifying a threshold for the size of a frame in which the aggregated packets will be transmitted. When a queue associated with a flow contains an amount of data for transmission exceeding the threshold, transmission of a frame may be triggered. This threshold may be specified, for example, in kilobytes. As a specific example, this value may range between 4 kilobytes and 64 kilobytes. According to some embodiments, a value in this range may be selected according to a formula or in any other suitable way to select a larger threshold on the packet size for lower error rates.

As another example, in embodiments where a signal strength and an error rate are measured channel conditions, these values could be combined to determine aggregation parameters. The signal strength may be represented by a received signal strength indication (RSSI). In some embodiments, the signal strength is represented by a relative, unitless value, though a specific measurement may also be used. For example, signal strength may be indicated by received power (e.g., in decibel-milliWatts). The error rate may be measured, for example, as a bit error rate (BER), or per packet, as a packet error rate (PER). PER may represent a percentage of packets that are unsuccessfully transmitted from the wireless source device to the wireless destination. Specifically, the PER may be calculated as the ratio of unsuccessful packet transmissions to the total number of packets transmitted. In some embodiments, test packets are transmitted to determine the PER, though the PER may be tracked as packets are sent based on data generated by applications running on a computer. In contrast, BER may represent a number of bit errors as a percentage of total bits received. Such a value can be determined by error correcting circuitry in a wireless network interface.

Regardless of how the signal strength and error rate are determined, the combination of these values may indicate appropriate aggregation parameters, either alone or in combination with other information. For example, a threshold for frame size that triggers transmission of a frame containing buffered data may be increased in relation to signal strength such that, on average, longer frames will be transmitted when signal strength is higher. Alternatively, the threshold for frame size may be decreased in relation to error rate such that, on average, shorter frames will be transmitted when error rate is higher.

One or more conditions may be used together to establish an aggregation parameter. For example, the amount of aggregation, as reflected by increasing a threshold for frame size, may increase in proportion to signal strength only if the error rate is below some threshold. For error rates above the threshold, no aggregation may be employed and packets may be transmitted, using known techniques, as data is generated by applications.

In some instances, multiple aggregation parameters may be determined. For example, for certain applications or for certain packet types, different amounts of latency may be appropriate or tolerable. One or more aggregation parameters that control latency may be specified. Latency may be controlled, for example, through a time parameter indicating the amount of time a packet will remain in a queue before triggering transmission of the queued data, regardless of whether the frame meets a size parameter.

This time parameter may be set higher for applications that can tolerate larger latency. Applications that transmit files or other large blocks of data may tolerate large latency and may have a relatively long time parameter. On the other hand, applications, such as those that use voice over IP (VoIP) may require a low latency and receive a low time parameter, which may be as low as zero to indicate that packets are not queued for aggregation.

At step 305, packets are aggregated for a flow until the aggregation parameters are met. If multiple parameters are established, the aggregation parameters in total may include criteria for how the parameters are applied. In the example of a size and a time parameter, packets in a flow may be queued until either parameter is met. Though, other embodiments are possible in which packets are queued until multiple parameters are met. For example, the threshold size may decrease the longer data has been queued such that determining whether the aggregation parameters are met may be accomplished by applying a formula based on size and time parameters. More generally, the criteria included with the aggregation parameters may specify that packets be queued until a specified condition based on any number of parameters combined in any suitable way is met.

Processing at step 305 may include buffering packets in any suitable way. Packets for a flow may be collected in a queue and the queued packets aggregated into a frame when the aggregation parameter is met. For example, if a threshold number of packets to be aggregated is reached the packets in the queue are aggregated into a frame. In some embodiments, the frame comprises the aggregated packets and an appropriate frame header in accordance with MSDU.

At step 307, the frame is transmitted to the destination address of the flow. The frame may be transmitted by the WNIC of the wireless device corresponding to the source address of the flow.

FIG. 3B is a flow diagram of a method 310 for aggregating and transmitting packets using the application type of the application generating the packets to determine the aggregation parameters.

At step 311, the application type of each application sending packets is determined. The application type indicates the nature of data generated by the application for transmission over the network. In some embodiments, the application is configured to identify its type, such as by calling a programming interface between the applications and an operating system (OS) of the wireless device.

Any suitable classification scheme may be used to define application type. As one example, applications may be classified as voice, video, file transfer, and background applications. Though any suitable application types alternatively or additionally may be included in the set of possible application types. Background applications include low priority applications executing during idle times of the wireless device.

At step 313, packet aggregation parameters are determined for each flow based at least in part on the application type. In defining flows, only compatible packets are aggregated in the same flow. In the embodiment illustrated, each flow contains only packets generated by applications of the same type. The aggregation parameters may be determined from the application type in any suitable way. As one example, each application type may be associated with an entry in a look-up table. An acceptable delay associated with the application type may be used to define an aggregation parameter. In some embodiments, a threshold aggregation time is defined based on the acceptable delay for the application. As a specific example, the threshold aggregation time may be determined as a percentage of the total acceptable delay or the acceptable delay less some estimate of the time required for framing and transmitting the packet.

At step 315, packets are aggregated in a queue until aggregation parameters are met. In embodiments when a first packet is added to a queue, a delay timer may be set to the threshold aggregation time. Expiration of the delay timer indicates that the threshold aggregation time aggregation parameter has been met.

At step 317, the data in the queue is formed into a frame and transmitted. Transmission of the frame may be performed in ways similar to those described for step 307 of method 300 above (FIG. 3A).

In the example of FIG. 3B, flows, and aggregation parameters for each flow, are established in part based on an application type. An application type may be regarded as a quality of service (QoS) parameter. Such a QoS parameter would apply to all packets generated by the application. In some embodiments, applications, or other components within a system, tag individual packets with information indicating a QoS requirement. In such an embodiment, flows may be defined such that only packets with the same QoS parameter are aggregated and aggregation parameters may be selected for each flow based on the QoS parameter for the flow, either alone or in combination with other factors, such as sensed channel conditions.

FIG. 3C shows a flow diagram of method 320 for aggregating and transmitting packets using the packet's type to determine which packets to aggregate and which to send alone without aggregation. The example of FIG. 3C may be regarded as a special case of setting aggregation parameters including a threshold aggregation time. In this example, the threshold aggregation time for certain flows is set to zero for those flows in which packets are to be transmitted immediately, without buffering for aggregation.

At step 321, packets for transmitting are received. The packets may be received by an OS of the wireless device or a suitable hardware and/or software component for processing packets. Packets may be received from applications executing on the wireless device or from any other suitable source.

At step 323, the process branches depending on the type of packet received. FIG. 3C illustrates processing for acknowledgement (ACK) packets. As is known in the art, some network protocols, such as TCP, specify sending acknowledgement packets to indicate that another packet has been received or, in some cases, processed. In this example, ACK packets may be regard as acknowledgement packets in accordance with any such protocol.

For each received packet a determination is made of whether the packet is an acknowledgement (ACK) packet. The packet's type may be determined in any suitable way. In some embodiments, packet type is specified by a header portion of the packet. In some embodiments the payload of the packet is analyzed to determine if the packet is an ACK packet or any other type of packet to be transmitted individually.

If it is determined at step 323 that a packet is an ACK packet method 320 continues to step 325 where the packet is sent without buffering the ACK packet such that it possibly could be aggregated with other packets.

If the packet is not an ACK packet, method 320 continues to step 327 where the packet is aggregated in any suitable way. For example, the packets may be aggregated in accordance with method 300 (FIG. 3A) and/or method 310 (FIG. 3B), though any suitable method for aggregating packets may be used.

At step 329, once a set of packets have been aggregated into a frame at step 327, the frame is sent. Transmission of the frame may be performed in ways similar to those described in step 307 of method 300 (FIG. 3A).

Though FIG. 3C illustrates aggregation processing for ACK packets, similar processing may be performed for other packets. For example, some protocols allow certain packets to be designated as RTP packets. Packets of this type may be processed as in FIG. 3C, which illustrates that buffering and checking for satisfaction of aggregation parameters simply may be omitted for packets of certain types.

Figure 4A:
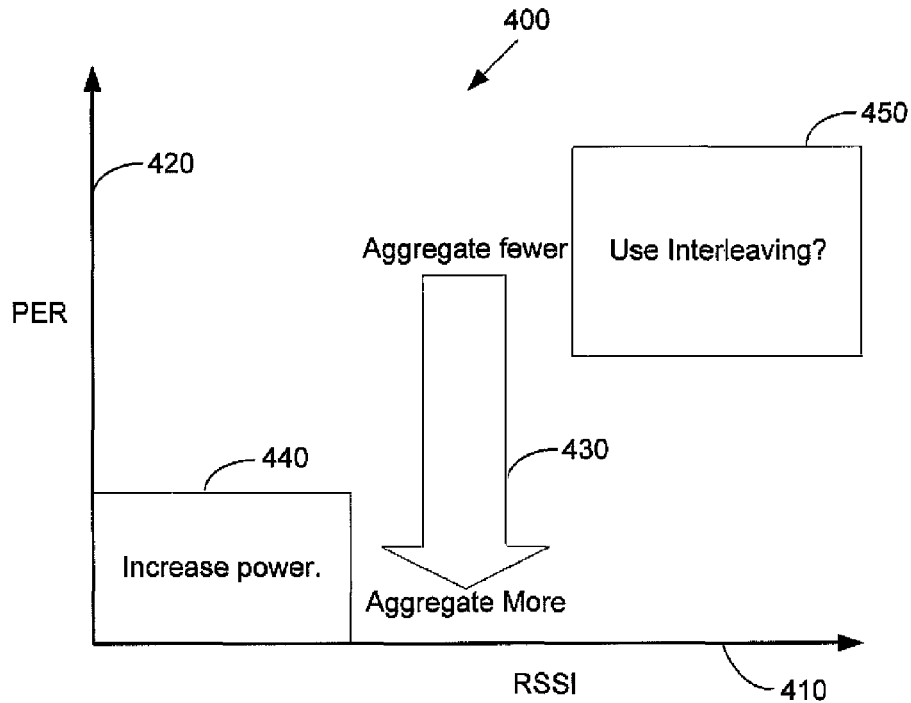
FIG. 4A is a conceptual plot showing how aggregation parameters may be determined based on channel conditions according to some embodiments.

Turning to FIG. 4A, plot 400 illustrates ways of determining aggregation parameters based on the channel conditions. In this example, a plot of channel conditions is illustrated, with RSSI on axis 410 and PER on axis 420. Arrow 430 indicates that according to some embodiments, aggregation is increased as PER decreases. In an embodiment in which aggregation parameters include a threshold size and a threshold time to queue packets before triggering transmission of a frame with queued packets, aggregation may be increased by increasing either or, in some instances, both the time and size aggregation parameters.

Channel conditions may be used to modify other aspects of a wireless transmission, either in combination with setting aggregation parameters. According to some embodiments, when the signal strength is low and the PER is also low, as generally indicated by region 440, the transmitter power may be increased. A low PER indicates that interference sources are not present. The channel throughput may be improved simply by increasing the broadcast power. Increasing power may be limited to low PER levels since increasing the transmission power when there are significant sources of interference (as indicated by a higher PER) is likely to encourage those interference sources to also increase their transmitted power, nullifying the advantages of increased power output.

An interference source may cause bursty errors. Bursty errors appear as groups of bit errors between intervals of few or no errors. The burst of errors may correspond to a time the interference source is simultaneously transmitting. For packets that include error correcting bits, the number of bit errors that can be corrected depends on the number of bits devoted to error correction. Though, when a large number of errors occur in a burst during a transmission of a frame, any packets being transmitted during an error burst are likely to have more errors than can be corrected with the error correction bits of the packet. By interleaving the bits of the various packets within a frame, the likelihood that a burst error will overwhelm the error correction code of any individual packet is reduced. Thus, though interleaving could be used at any time, it could be selectively applied, as indicated in FIG. 4A, only when bursty errors are detected.

Bursty errors may be detected in any suitable way. Bursty errors generally result in a high PER. When RSSI is also large, as indicated generally by region 450 of plot 400, bursty interference may be indicated. Thus, when channel conditions fall within region 450, the bits of the packets within a frame may be suitably interleaved before transmission. In some embodiments, interleaving is performed by the operating system of a wireless device, a WNIC, or any other suitable combination of hardware and/or software.

In embodiments in which power is increased, interleaving is applied or other adaptation is made in response to sensed channel conditions, aggregation parameters may be recomputed after the adaptation. When re-computing the aggregation parameters, the new parameters may be based on channel conditions as measured after the adaptation has been applied. In this way, for example, if an adaptation decreases the packet error rate, the amount of aggregation may be increased.

In some embodiments, power conservation criteria are used in defining appropriate aggregation parameters. For example, when a wireless device is being powered by a battery and the battery power is nearly exhausted, the most power efficient transmission and aggregation techniques may be used. On the other hand, when the battery is fully charged, aggregation parameters may be defined with less regard to power conservation. A lookup table or equation may be used to relate available power to suitable aggregation parameters. Though, available power may be used to define aggregation parameters in any suitable way. Because the power consumed performing aggregation depends on the combination of hardware and software used to implement aggregation, how aggregation parameters are specified to control power consumption may be device specific.

Figures 4B, 4C:
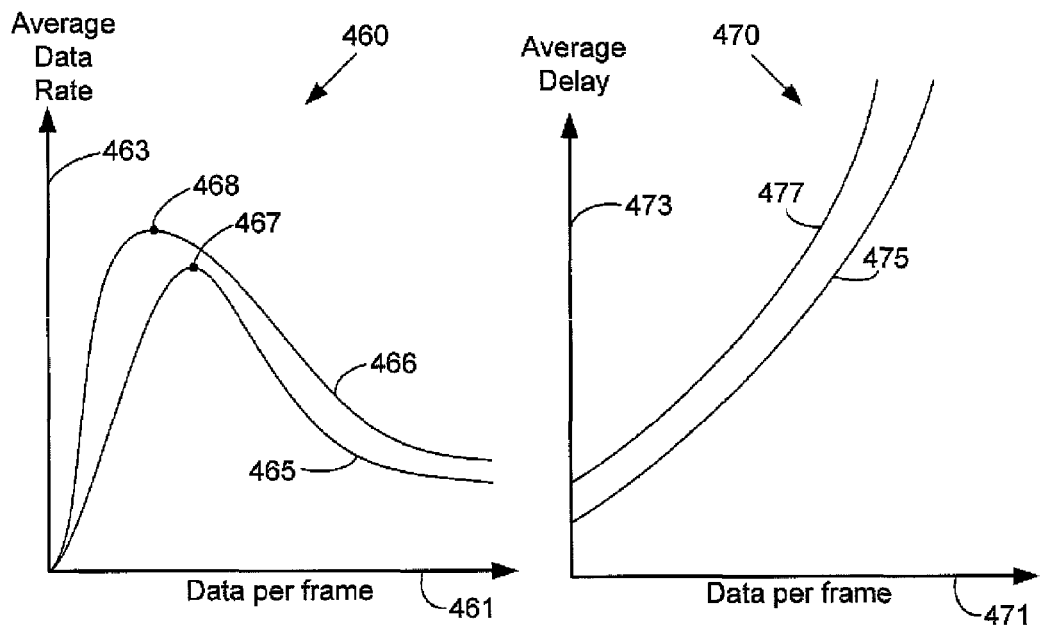
FIG. 4B is a conceptual plot showing how aggregation parameters may be chosen to improve throughput for given channel conditions according to some embodiments.
FIG. 4C is a conceptual plot showing how aggregation parameters may be chosen to meet delay requirements for given channel conditions according to some embodiments.

Plot 460 in FIG. 4B illustrates an approach to determining aggregation parameters. Plot 460 indicates performance as a function of a transmission characteristic that can be varied by changing aggregation parameters under one or more channel conditions. One approach to selecting an aggregation parameter is to identify a value of the transmission characteristic that maximizes the performance.

In the example of FIG. 4B, the aggregation parameter varied specifies data per frame transmitted, which may be determined based on a threshold number of packets to be aggregated in the frame or threshold size of the frame before transmission of a frame is triggered. Plot 460 illustrates conceptually the average data rate 463 as a function of the data per frame 461 under varying channel conditions. Specifically, curve 465 represents the average data rate achieved as a function of the amount of data contained in a frame for a given set of channel conditions. The average data rate is zero when no information is included in the frame. The data rate increases until some peak 467 is reached because the overhead relative to the amount of data transmitted is decreasing. As the data per frame increases further, however, the likelihood of a packet errors increases. When errors occur, data throughput goes down and eventually overtakes any advantage of larger frames. Curve 466 represents a different set of channel conditions for which the peak 468 data rate is achieved for a different amount of data per frame.

Thus, FIG. 4B illustrates an approach for selecting an aggregation parameter linked to frame size. A plot as in FIG. 4B may be constructed, such as by using historical measurements, theoretical predictions or in any other suitable way. The plot may include a set of curves associated with different channel conditions. Once channel conditions are measured, an appropriate curve is identified. A frame size may then be determined by finding a maxima of the selected curve. This frame size may be used to set a threshold on the amount of data to be queued before transmitting the queued data in a frame.

Plot 470 in FIG. 4C illustrates another example of a plot that can be used to select aggregation parameters. In this example, the average delay 473 in receiving a frame as a function of data per frame 471 is plotted under a plurality of channel conditions. Curve 475 represents one set of channel conditions and curve 477 represents another set of channel conditions. As generally indicated by curves 475 and 477, there is certain amount of delay due to sending overhead, even if no information is sent. As the data per frame 471 increases, the average delay also increases. For fixed channel conditions, the average delay is expected to increase as the data per frame increases. The average delay may increase non-linearly due in part to larger frames being subject to a greater likelihood of errors and retransmission.

In plot 470 of FIG. 4C, there are not maxima as in plot 460 of FIG. 4B. Nonetheless, a plot such as is in FIG. 4C may be used to select a parameter related to data per frame. For example, a desired average delay may be identified. This value may be selected as a percentage of an allowable delay associated with a QoS requirement or in any other suitable way. The maximum data per frame that results in an average delay less than the desired average delay may then be selected.

As is the case with plot 460 of FIG. 4B, plot 470 of FIG. 4C may be constructed based on historical measurements, theoretical prediction or a combination of both. Though, any suitable approach may be used to construct a performance plot as indicated. Plot 470 may be captured in any suitable way for use in dynamically setting aggregation parameters. The plot may be converted to a representation that can be manipulated by a processor and stored in memory of a computer. That representation could be an equation, data table or other suitable representation. Though, results of using such a plot alternatively may be captured by computing in advance parameter selections that result from using the plot for various flows and various channel conditions. These pre-computed values may be stored in a table in computer memory or in any other suitable representation and applied in operation as flows are identified and channel conditions are measured.

Approaches for aggregating packets into frames may be employed in any suitable devices, including wireless nodes or access points. As an example of such a device, a wireless device 500 that aggregates packets into frames is now described with reference to FIG. 5. Wireless device 500 may be implemented with any suitable device capable of wireless communication. Wireless device 500 may include, a processor 510, memory 520 and network interface 540. Operating system (OS) 530 and applications 550-552 may be stored in memory 520, or implemented in any suitable combination of hardware and/or software. Computer-executable software instructions may be executed by processor 510.

Processor 510 may be any suitable processing device such as, for example and not limitation, a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 520 may be integrated into processor 510 and/or may include "off-chip" memory that may be accessible to processor 510, for example, via a memory bus (not shown).

Memory 520 may store software modules that when executed by processor 510 perform a desired function. Memory 520 may be any suitable type of computer-readable storage medium such as, for example and not limitation, RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, or other semiconductor devices, or other tangible computer storage medium.

Wireless device 500 also includes a network interface, here a wireless network interface 540, for communicating as part of a network. Network interface 540 may be any suitable combination of hardware and software configured to communicate over a network. For example, the network interface 540 may be implemented as a network interface driver 542 and a network interface card (NIC) 541 including a wireless transmitter and receiver, or equivalently a transceiver. Network interface driver 542 may be configured to receive instructions from other components of wireless device 500 to perform operations with NIC; 541. NIC 541 is a channel interface to form a wireless connection to the wireless network. NIC 541 is configured to generate and receive signals for communication over a wireless network. Network interface driver 542 may perform measurements with NIC 541 to characterize the channel conditions of a wireless communications channel with which network interface 540 is communicating through. A wired network interface may similarly have a suitable driver and channel interface to communicate over a wired communications channel.

Figure 5:
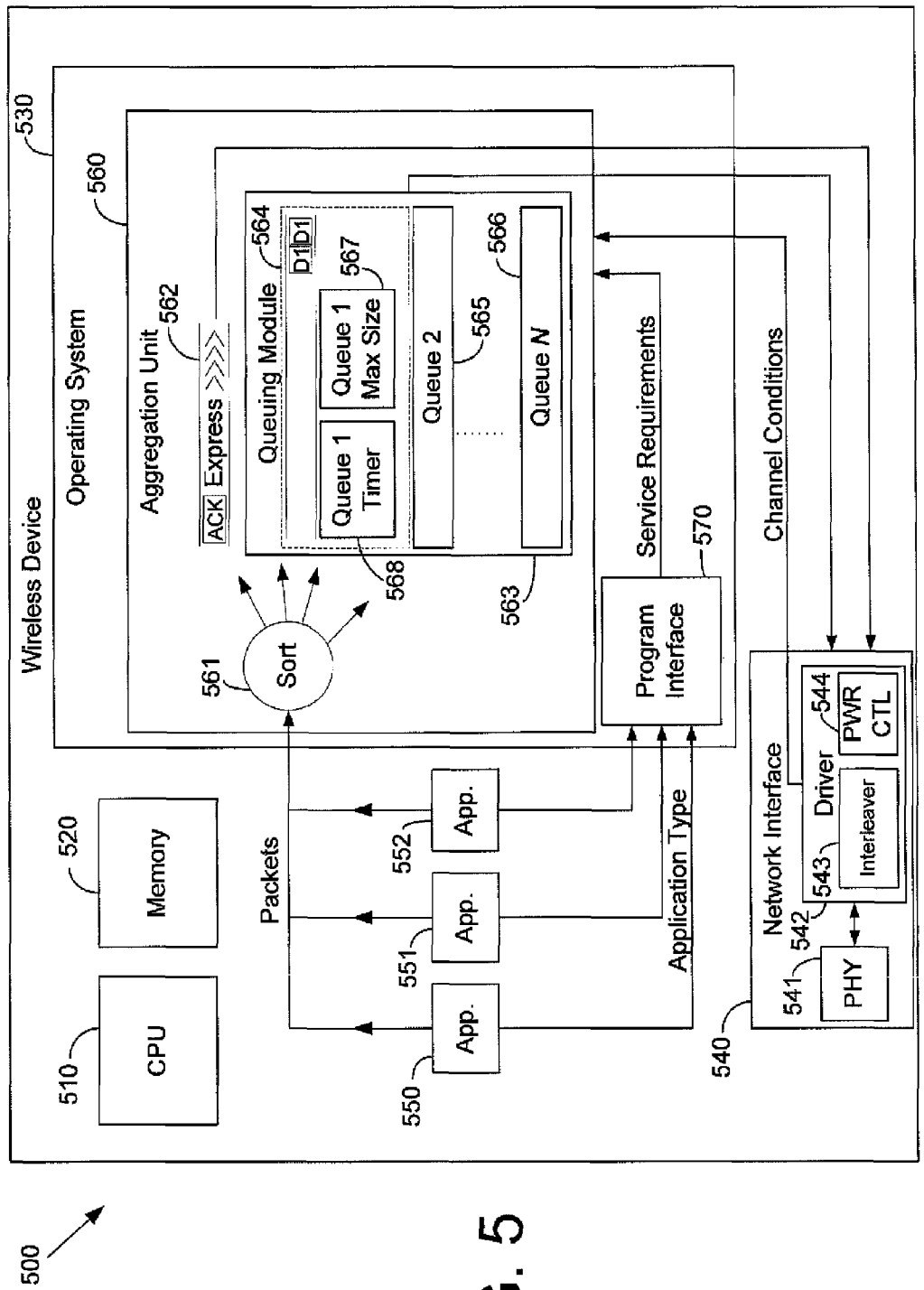
FIG. 5 is a block diagram of a wireless device for aggregating and transmitting packets according to some embodiments.

The channel conditions may be provided to an aggregation unit 560. Although only one network interface is shown in FIG. 5, it should be appreciated that wireless device 500 may have any suitable number of wireless and or wired network interfaces. Each wireless network interface may support a wireless networking technology, such as IEEE 802.11, Wi-Fi, Zigbee, WWAN, cellular, Bluetooth, Wireless 1394, UWB, HiperLAN, Wireless USB, or any other suitable wireless networking technology. Each wired interface may support a wired network technology, such as Ethernet, token ring, FDDI, and ARCNET, or any other suitable wireless networking technology.

Applications 550-552 generate or process data. Though three applications are shown for wireless device 500, any suitable number of applications may be present. In some cases multiple instances of the same application may be simultaneously active. An application may have one or more components that provide certain functionalities of the application. The application level components may generate packets in a known way for transmission over a network.

OS 530 may provide functions for applications 550-552 executing on wireless device 500, for example, through function calls from the application. In addition, OS 530 may manage the activities and sharing of resources of wireless device 500. OS 530 may provide various functions and manage wireless device 500 through various components. Components may include, for example and not limitation, dynamically linked libraries (e.g., a dynamic-link library), application programming interfaces (APIs), component object models (COMs), globally unique identifiers, registry keys, or any uniquely identifiable part of OS 530. Components of OS 530 may also generate packets to be transmitted over a network.

In some embodiments, aggregation unit 560 is implemented as computer-executable component of OS 530, such as within a network stack of the OS. Though, aggregation unit 560 may be implemented outside OS 530 or in any suitable combination of hardware and software. For example, in some embodiments, aggregation unit 560 is implemented as part of network interface 540. Aggregation unit 560 receives packets from applications 550-552 to be transmitted by a wireless network interface such as network interface 540.

Aggregation unit 560 may include a sorter 561 and a queuing module 563. Outgoing packets are sorted by sorter 561 by flow. Packets in flows to be transmitted without aggregation, such as ACK packets, may bypass queuing module 563 and are sent via express lane 562 to the designated network interface for transmission. Packets to be aggregated are sorted into queues in queuing module 563 based on the flow to which the packet belongs. Queuing module 563 buffers the packets in each respective queue until the aggregation parameters for that queue are met.

The flow of a packet may be determined from information contained in a packet and/or provided with the packet in setup prior to the time the flow was initiated. In this example, the flow is identified based on the source address, destination address, and QoS requirements associated with the packet. Though, the flow may be identified in any suitable way. In the case in which source and destination addresses are used to identify a flow to which a packet belongs, the source address may be an address of the network interface to send the packet, such as the MAC address of network interface 540. The destination address may be the address of the wireless receiver to which the packet is to be transmitted wirelessly by a wireless network interface.

The QoS requirements specify requirements on how the packet is serviced during the transmission process. QoS requirements may define any of acceptable delay, bit rate, jitter, packet dropping probability, transmission error rate, processing priority, and any other requirements for packet delivery. The QoS requirements may be specified by a priority tag in the packet in accordance with the communication protocol. Though the QoS requirements may be determined in any suitable way.

Each application 550-552 may be configured to specify an application type through a programming interface 570 of OS 530. In some other embodiments, the packets sent by application 550-552 to aggregation unit 560 specify the application type. Though, the application type may be determined in any suitable way. Programming interface 570 may be an API. In some embodiments, the application type may be specified as voice, video, background or file transfer type, though any other type or set of application types may be used. The application type may be a used alone or in combination with other values to define a flow. For example, a flow may be defined by the 3-tuple <source address, destination address, application type>.

In some embodiments, each application type is associated with one or more QoS requirements that may be used in setting aggregation parameters. The QoS requirements associated with an application type may be obtained from a lookup table or in any suitable way. In some embodiments, the applications specify QoS requirements directly to programming interface 570.

In the example illustrated, each flow has a corresponding queue in queuing module 563. Sorter 561 directs packets to be aggregated in the queue which corresponds to the flow for the packet. If a new flow for which no queue exists is recognized or registered, a corresponding queue may be created in queuing module 563.

Queues 564-566 are shown in queuing module 563. Each queue may have a unique set of aggregation parameters, both type and value. Therefore in the illustrated embodiment, all queues have the same type of aggregation parameters though different values may be assigned to each queue. Queue 1 (ref. no. 564) has aggregation parameters threshold aggregation size 567 and a threshold aggregation time. Threshold aggregation size 567 specifies the maximum number of packets, or other unit of data, to be aggregated before sending the packets in Queue 1. Timer 568 may be set to the threshold aggregation time and configured to expire when the time since the first packet was queued equals the maximum aggregation time. The threshold aggregation time may be based on the allowable delay time specified by the QoS requirements. When the first packet is queued timer 568 is started.

When the aggregation parameters for Queue 1 are met, the aggregated packets are prepared as a frame. Similarly, when the aggregation parameters for any other queue is met, the corresponding queue's aggregated packets are prepared as a frame. How aggregation parameters are met may be defined in any suitable way. In some embodiments, aggregation parameters may be met when an individual parameter is met or when some combination of parameters are met.

The frame prepared when aggregation parameters are met may be, for example, an MSDU frame or an MPDU frame, though any suitable format may be used. The frame is forwarded to the network interface corresponding to the source address for the flow and wirelessly transmitted to the destination address.

Once the aggregation parameters have been met, the queue may be deleted or cleared. If the queue is deleted, aggregation unit 560 effectively recreates the queue when a packet corresponding to the flow is again encountered by sorter 561. If the queue is cleared, sorter 561 places in the queue subsequent packets for the corresponding flow. In embodiments where queues are simply cleared, aggregation unit 560 may delete queues that appear to no longer be in use. For example, aggregation unit 560 may delete a queue when a packet for the corresponding flow has not been received for a predetermined amount of time or if the application indicates the flow has been closed and is no longer in use.

Network interface driver 542 may be configured to control an interleaver module 543 and a power control module 544. These modules may be implemented in any suitable combination of hardware and software.

Interleaver module 543 may be configured to interleave bits of packets in a frame to be transmitted. Some example circumstances where the interleaver module 543 may implement interleaving are described above with reference to plot 400 of FIG. 4A. For example, interleaving may be activated when both the signal strength and PER are above respective thresholds. In some embodiments, OS 530 may be configured to control when interleaving is applied to packets in a frame.

Though interleaver module 543 is shown as a module of the network interface driver 542, other embodiments are suitable. For example, aggregation unit 560 may be configured to interleave frames or packets prior to being forwarded to the appropriate network interface.

Power control module 544 is configure to control the output power of network interface 540's transmitter. OS 530 or aggregation unit 560 may be configured to provide instructions to driver 542 when power control module 544 is to increase or decrease transmitter power. Some example circumstances in which the transmitter power may be controlled are described above with reference to plot 400 of FIG. 4A. In some embodiments, power control module 544 is configured to increase the power when both the signal strength and PER are below respective thresholds.

Figure 6A:
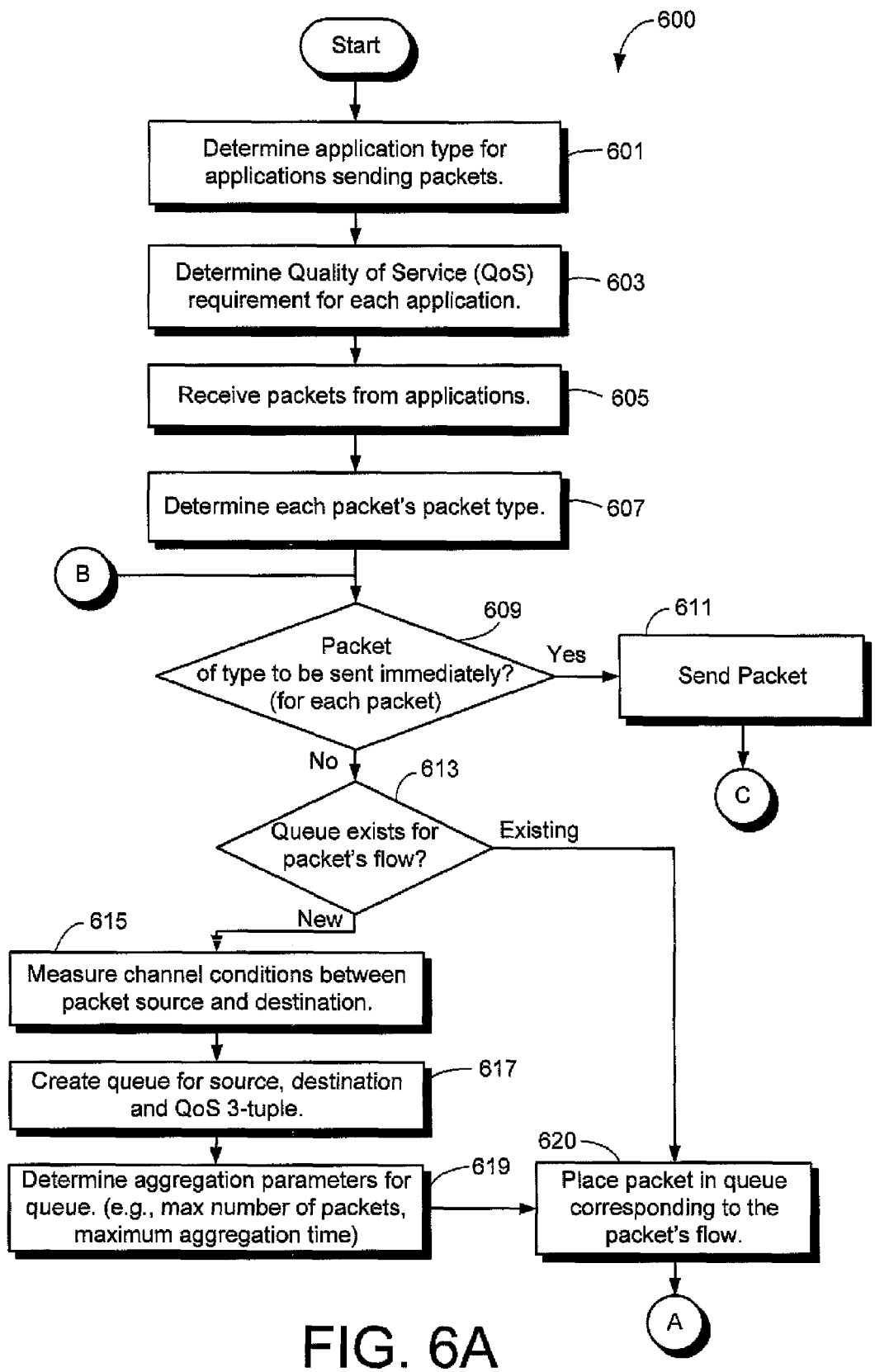
FIGS. 6A-6B is a flow diagram of a method for aggregating and transmitting packets according to some embodiments.
Figure 6B:
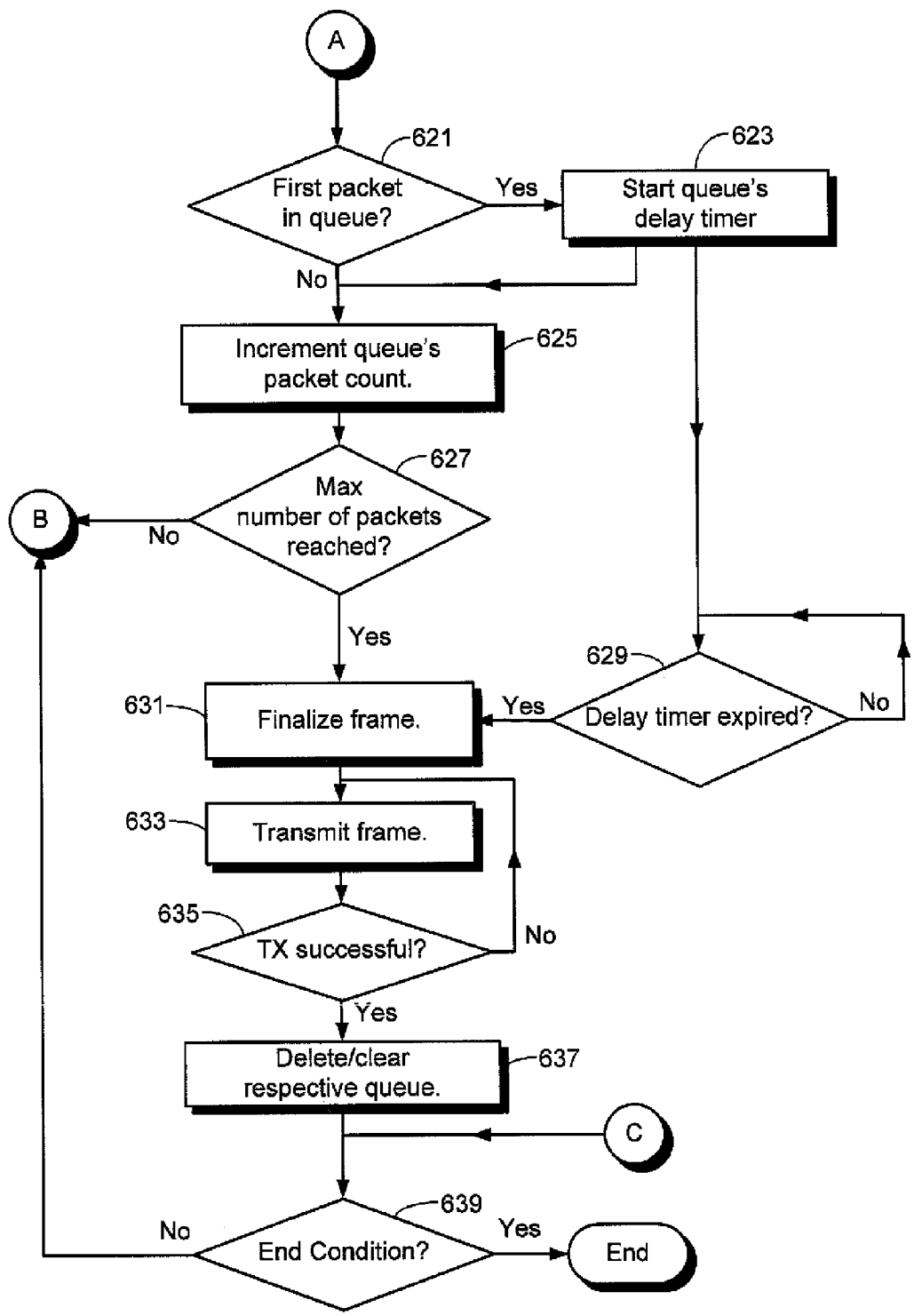

Turning now to FIGS. 6A-6B, a method 600 for aggregating and transmitting packets is now described. Method 600 may be implemented using a wireless device such as wireless device 500 (FIG. 5), though method 600 may be implemented in any suitable way.

At step 601 the application type for each application sending packets is determined. Applications may indicate their respective application type through a programming interface (e.g., ref no. 570, FIG. 5) of an operating system of the wireless device. Though, application types may be determined in any suitable way. In some embodiments, the application type is one of voice, video, file transfer, and background applications, though any suitable application types may be used. In some embodiments, applications provide characteristic information through the programming interface and the programming interface categorizes each application according to a predefined set of application types. In some embodiments, the programming interface is an API.

At step 603, the QoS requirements are determined for each application. The QoS requirements determined may include, for example, any of acceptable delay, bit rate, jitter, packet dropping probability, transmission error rate and any other requirements for packet delivery. The QoS requirements may be determined from the application type obtained at step 601. The QoS requirements may be obtained from a look-up table which relates the application type to one or more QoS requirements. In some embodiments, the QoS requirements are determined directly from the packets when received from the applications. For example, QoS requirements may be indicated by part of the packet's overhead portion or payload.

At step 605 packets are received from one or more of the applications. Packets may have any suitable format of data. In some embodiments the packets include information for transmitting over a network such as an Ethernet and/or IEEE 802.11 header.

At step 607, each packet's packet type is determined. In some embodiments, the packet type may be determined from the overhead portion of a packet. In some embodiments, the packet type may be determined from the information being carried by the packet—its payload, or by information stored within the packet. Though, packet type may be determined for each packet in any suitable way.

Steps 609, 611, 613, 615, 617, 619, 620, 621, 623, 625, and 627 are repeated, as necessary, for each packet to be sent. These steps may be performed serially for each packet or may begin as soon as the packet is received. For example, the steps may be performed in separate threads for each packet.

At step 609, method 600 determines whether the packet's packet type is a type to be sent without aggregation. In some embodiments, packets to be sent without aggregation are ACK or RTP packets and all other packets are aggregated. In some embodiments, packets are effectively sent without aggregation by assigning the packets to a queue with special aggregation parameters. For example, such a queue may have a maximum number of packets to aggregate set to one or a threshold aggregation time set to zero.

If it is determined at step 609 that the packet is of a packet type to be sent immediately, method 600 continues to step 611 where the packet is sent using a network interface corresponding to the packets source address.

For packets which it is determined at step 609 are suitable to aggregate, method 600 continues to step 613. At step 613 it is determined if the packet is part of a new or existing flow. The flow is defined by at least a source address, destination address, and one or more QoS requirements. The QoS requirements may be determined from the type of application sending the packet or in any other suitable way.

If it is determined at step 613 that the flow is an existing flow, steps 615-619 are skipped. If, however, it is determined that the packet corresponds to a new flow, method 600 proceeds to step 615. At step 615 the wireless channel conditions are measured between the source and destination address for the new flow. A network interface corresponding to the source address and controlling a channel with the destination address may be configured to provide the channel conditions Any suitable channel conditions may be measured. For example, the channel's packet error rate (PER) and signal strength may be measured. Step 615 may be optionally omitted, for example, when channel conditions for the flow or a related flow are stored in memory. For example, channel conditions for a flow having the same source and destination address but different QoS requirements may be used for the new flow.

At step 617, a queue is created for the new flow, as defined by the source, destination, and QoS requirements 3-tuple.

At step 619, the aggregation parameters are determined for the queue. The aggregation parameters may be based on the channel conditions and QoS requirements of the packet. In some embodiments, aggregation parameters may be selected in ways described in connection to plot 400 (FIG. 4A), plot 460 (FIG. 4B), and plot 470 (FIG. 4C). For example, an aggregation parameter specifying the maximum number of packets to aggregate may be determined based on the channel conditions. Additionally, the application type and/or QoS requirements may play a role. For example, voice applications may be aggregated into frames having a smaller number of packets while streaming media may be aggregated into frames having a relatively larger number of packets. When PER is low, this is practicable, however, when PER is large, the maximum number of packets that should be aggregated is likely to be lower.

The threshold aggregation time may be determined based on the application type and/or QoS requirements of the packet. For example, a shorter aggregation time may be set for applications that require a lower latency.

At step 620 the packet is buffered in the queue corresponding to the packet's flow.

At step 621 (FIG. 6B), it is determined whether the packet is the first packet in the queue. If so, method 600 proceeds to step 623 where the queue's delay timer is set to the threshold aggregation time and started. Once the delay timer has been started it is monitored at step 629 until, for example, it has expired.

After starting the delay timer, or if at step 621 it was determined that the packet is not the first packet in the queue, the queue's packet count is incremented. If a byte or bit count is used, the size of the packet is added to a count of the packets total size.

At step 627 it is determined whether the maximum number of packets in the queue has been reached. The determination may be made by comparing the queue's packet count to the maximum number of packets to be aggregated for the queue. In some embodiments, the size of the aggregated packets is compared to a corresponding aggregation parameter. If the maximum number of packets to be aggregated has not been reached, method 600 returns to step 609 and continues processing other packets.

If the maximum number of packets to be aggregated for the queue is reached (step 627) or the delay timer expires (step 629), the packets in the queue are formed into a frame at step 631. This may be done according to any suitable form of frame aggregation. The packets may be arranged in the frame in the order in which they were queued or in any other suitable arrangement. In some embodiments, overhead data for the wireless communication is added to the aggregated packets. For example, the packets may be formed into an MSDU frame. In some other embodiments, the packets may form an MPDU frame.

At step 633, the frame is transferred from the source address to the destination address over the corresponding wireless channel. Because all the aggregated packets are for the same flow, the source and destination address is common to all of the packets. A wireless network interface corresponding to the frame's source address may be used to transmit the frame. In some embodiments, prior to transmission, the frame is interleaved.

At step 635, it is optionally determined if the transfer is successful. For example, flows defined by a QoS requirements the requires reliable transmission may implement step 635. If the transfer was unsuccessful, method 600 returns to step 633 and the frame is retransmitted.

If at step 633, it is determined that the transmission was successful, or if step 633 is optionally omitted, method 600 continues to step 637 where the queue is deleted or cleared. If deleted, subsequent packets for the same flow will recreate the queue (see steps 613-619). If cleared, the packets aggregated in the frame are removed from the queue and the queue's packet count is reset. Subsequent packets corresponding to the same flow may be sorted to the queue. Even if queues are simply cleared, it may be appropriate to periodically update the aggregation parameters by measuring channel conditions again. This may ensure the packets are being aggregated in a way the accurately reflects the current channel conditions.

At step 639, a determination is made as to whether an end condition has been met. Method 600 may be ended at step 639, for example, when a user indicates that wireless network interfaces are to be disabled, when the user turns off the wireless device, or when the applications sending packets for wireless transmission have been closed. If a suitable end condition has not been reached, method 600 returns to step 609 where subsequent packets are processed.

Though method 600 has been described assuming the flows are between wireless source and destination addresses, it should be appreciated that flows may be between wired source and destination addresses. Some embodiments of method 600 may support aggregation of both wired and wireless flows.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable storage device comprising computer executable instructions that, when executed by a wireless device, perform a method comprising acts of:
    determining a channel condition of a wireless channel from the wireless device, the wireless device comprising a wireless network interface that provides the wireless channel and that measures a received signal strength corresponding to the wireless channel, wherein the channel condition is determined according to the received signal strength;
    determining packet characteristics of outbound packets generated by the wireless device for transmission, the packet characteristics comprising characteristics of the outbound packets and characteristics of network connections corresponding to the outbound packets;
    managing a plurality of queues in which the outbound packets are enqueued, the managing including determining, according to the packet characteristics, which queues will receive which outbound packets, wherein the outbound packets enqueued to any given queue have a same packet characteristic, and wherein there are aggregation parameters for the queues, respectively;
    aggregating the outbound packets in the queues according to the aggregation parameters;
    adapting communication based on the sensed received channel condition, the adapting comprising updating the aggregation parameters according to the channel condition, wherein when the channel condition has a first value the aggregation parameters are updated with first respective values, and when the signal strength has a second value the aggregation parameters are updated with second respective values, wherein the aggregating is adapted according to the changing channel condition.

2. The computer-readable storage device of claim 1, wherein:
   wherein a network characteristic comprises an address of a common destination network address;
   and the method further comprises an act of transmitting to the common destination network address a frame into which outbound packets have been aggregated.

3. The computer-readable storage device of claim 1, the method further comprising an act of measuring a transmission error rate, wherein the channel condition is determined according to the transmission error rate.

4. The computer-readable storage device of claim 1, wherein:
   the act of updating for a given aggregation parameter comprises determining a maximum number of outbound packets to be aggregated based at least in part on the channel condition;
   the act of aggregating for a given queue corresponding to the given aggregation parameter comprises starting a delay timer when a first outbound packet is enqueued to the given queue; and
   enqueueing additional outbound packets to the given queue until the maximum number of packets to be aggregated is reached or the delay timer has expired.

5. The computer-readable storage device of claim 1, wherein:
   the outbound packets include a first plurality of outbound packets, the first plurality a subset of a second plurality of outbound packets;
   the method further comprises receiving the second plurality of outbound packets from at least one application executing on the wireless device, each outbound packet among said second plurality of outbound packets having a quality of service requirement; and
   the act of updating a given aggregation parameter comprises determining a threshold aggregation time based at least in part on the quality of service requirement of at least one outbound packet among the first plurality of outbound packets.

6. The computer-readable storage device of claim 1, wherein the computer executable instructions form at least a portion of an operating system for the wireless device.

7. The computer-readable storage device of claim 1, wherein:
   the outbound packets include a first plurality of outbound packets, the first plurality of outbound packets containing only outbound packets having a packet type other than an acknowledgement packet type, wherein a packet characteristic comprises the packet type; and
   the method further comprising acts of:
      receiving a second plurality of outbound packets from at least one application, the first plurality of outbound packets being a subset of outbound packets within the second plurality of outbound packets;
      determining a packet type for each of the second plurality of outbound packets; and
      transmitting outbound packets having an acknowledgment packet type without aggregation thereof.

8. A system for transmitting packets over a communications channel, the system comprising:
   a processor and storage coupled with the processor;
   a network interface, coupled with the processor, having a channel interface and a driver, the driver being adapted to measure one or more changing channel conditions of the communications channel using the channel interface, the one or more channel conditions comprising a packet error rate or a signal strength, wherein the driver is executed by the processor; and
   a plurality of queues managed by an aggregation unit according to aggregation parameters of the queues, respectively;
   an aggregation unit that updates the aggregation parameters based at least in part on the one or more changing channel conditions and store the aggregation parameters in the storage, the aggregation unit comprising a packet interface for receiving, from applications executing on the system, outbound packets to be sent via the network interface and a program interface that receives, from at least one of the applications, an indication quality of service requirements for transmission of outbound packets generated by the at least one application;
   the aggregation unit updating a first aggregation parameter of a first queue according to the quality of service requirements and updating a second aggregation parameter of a second queue according to the one or more channel conditions;
   the aggregation unit enqueueing a first subset of the outbound packets into the first queue until the first aggregation parameter is met, and then forming a first frame by aggregating the first subset into the first frame, the first frame stored in the storage, the packets in the first subset having been selected for the first queue based on information provided through the program interface;
   the aggregation unit enqueueing a second subset of the outbound packets into the second queue until the second aggregation parameter is met, and then forming a second frame by aggregating the second subset into the second frame; and
   the network interface transmitting the first frame and the second frame.

9. The system of claim 8, wherein the communications channel is a wireless channel and the channel interface is a transmitter/receiver.

10. The system of claim 8, wherein:
    the indication of the quality of service requirements is an application type, the application type being one of a voice, video, background or file transfer type; and
    the program interface determines the indication of the quality of service requirements based on the indicated application type.

11. The system of claim 8, wherein the aggregation unit identifies outbound packets to be aggregated, and enqueues each of said identified outbound packets into the queues based at least in part on a flow corresponding to each the identified outbound packets.

12. The system of claim 11, wherein the aggregation parameters for a given one of the queues comprise a threshold size for the outbound packets in the given queue and a threshold packet aggregation time.

13. The system of claim 9, wherein the aggregation unit identifies some of the outbound packets as being acknowledgement packets and in response transmits the acknowledgement packets via the network interface without having added the acknowledgement packets to any of the queues.

14. The system of claim 9, wherein the first or the second frame is represented by a plurality of ordered bits, and the aggregation unit interleaves bits in the first or second frame by changing an order of at least a subset of the bits.

15. A method performed at a single network device, the network device comprising a wireless network interface and an operating system, the operating system comprising an aggregation unit, the method comprising:

receiving incoming packets through the wireless network interface;

repeatedly updating a channel condition according to a fluctuating signal strength as measured by the wireless network interface, or according to a fluctuating error rate of the incoming packets, or according to both the fluctuating signal strength and the fluctuating error rate;

generating outgoing packets by a plurality of applications executing on the network device, and determining packet characteristics of the outgoing packets, the packet characteristics comprising characteristics of the outgoing packets or characteristics of network connections through which the outgoing packets flow;

executing the aggregation unit, the aggregation unit generating and managing outbound queues from which outbound packets are queued before being transmitted via the wireless network interface, the managing including maintaining different aggregation parameters for the outbound queues, respectively, the maintaining comprising repeatedly updating the aggregation parameters with values determined according to the changing channel condition, wherein at least two of the outbound queues have different aggregation parameter values;

receiving the outgoing packets at the aggregation unit, and in response the aggregation unit distributing the outgoing packets to the outbound queues, the distributing comprising enqueueing the outbound packets to various of the outbound queues according to the packet characteristics of the outbound queues;

aggregating, by the aggregation unit, the outbound packets in the queues into transmission units according to the aggregating parameters, wherein how the outbound packets are aggregated depends on the fluctuating error rate, or the fluctuating signal strength, or both; and transmitting the transmission units through the wireless NIC.

16. A method according to claim 15, wherein the transmission units comprise frames.

17. A method according to claim 16, further comprising interleaving a plurality of bits of a frame when the signal strength and the error rate are determined to both exceed respective thresholds.

18. A method according to claim 15, further comprising increasing a transmission power level of the wireless NIC when the signal strength and the error rate are determined to both be below respective thresholds.

* * * * *